US012278078B2

(12) United States Patent
Zhang

(10) Patent No.: US 12,278,078 B2
(45) Date of Patent: Apr. 15, 2025

(54) FIELD EMISSION CATHODE DEVICE AND METHOD FOR FORMING A FIELD EMISSION CATHODE DEVICE

(71) Applicant: NCX Corporation, Raleigh, NC (US)

(72) Inventor: Jian Zhang, Durham, NC (US)

(73) Assignee: NCX Corporation, Raleigh, NC (US)

( * ) Notice: Subject to any disclaimer, the term of this patent is extended or adjusted under 35 U.S.C. 154(b) by 231 days.

(21) Appl. No.: 18/247,259

(22) PCT Filed: Sep. 29, 2021

(86) PCT No.: PCT/IB2021/058933
§ 371 (c)(1),
(2) Date: Mar. 29, 2023

(87) PCT Pub. No.: WO2022/070090
PCT Pub. Date: Apr. 7, 2022

(65) Prior Publication Data

US 2023/0369000 A1 Nov. 16, 2023

Related U.S. Application Data

(60) Provisional application No. 63/085,309, filed on Sep. 30, 2020.

(51) Int. Cl.
*H01J 9/18* (2006.01)
*H01J 1/304* (2006.01)

(52) U.S. Cl.
CPC ................ *H01J 1/304* (2013.01); *H01J 9/18* (2013.01)

(58) Field of Classification Search
CPC .................................... H01J 9/18; H01J 1/304
USPC .......................................................... 313/310
See application file for complete search history.

(56) References Cited

U.S. PATENT DOCUMENTS 5,834,971 A * 11/1998 Giguere .................... H03F 3/58 315/3.6
2009/0015133 A1* 1/2009 Tsai ........................ H01J 1/304 313/498

FOREIGN PATENT DOCUMENTS

CN 109065428 12/2018
JP 2003-346641 12/2003
JP 2005-166681 6/2005
JP 2012-164597 8/2012

(Continued)

*Primary Examiner* — Christopher M Raabe
(74) *Attorney, Agent, or Firm* — Womble Bond Dickinson (US) LLP

(57) ABSTRACT

A field emission cathode device comprises a field emission cathode including a cylindrical substrate and a field emission material deposited on a cylindrical surface thereof. The field emission cathode defines a longitudinal axis. A solenoid extends concentrically about the cylindrical surface, and defines a gap therebetween. The solenoid defines opposed open ends perpendicular to the longitudinal axis. A current source directs a constant polarity (DC) current to the solenoid, that forms a magnetic field along the solenoid. A gate voltage source electrically connected to the solenoid or the field emission cathode interacts therewith to generate an electric field inducing the field emission cathode to emit electrons from the field emission material into the gap. The emitted electrons are responsive to the magnetic field to spiral within the gap and about the longitudinal axis, in correspondence with the current flow in the solenoid, through the first open end of the solenoid.

18 Claims, 5 Drawing Sheets

(56) References Cited

FOREIGN PATENT DOCUMENTS

| | | |
|---|---|---|
| KR | 20070071918 | 7/2007 |
| KR | 20160102743 | 8/2016 |

* cited by examiner

FIELD EMISSION CATHODE DEVICE AND METHOD FOR FORMING A FIELD EMISSION CATHODE DEVICE

CROSS-REFERENCE TO RELATED APPLICATIONS

This application is a national stage filing under 35 U.S.C. 371 of PCT/IB2021/058933, filed Sep. 29, 2021, which International Application was published by the International Bureau in English on Apr. 7, 2022, as WO 2022/070090, and application claims priority from U.S. Application No. 63/085,309, filed on Sep. 30, 2020, which applications are hereby incorporated in their entirety by reference in this application.

BACKGROUND

Field of the Disclosure

The present application relates to field emission cathode devices and, more particularly, to a field emission cathode device and method of forming a field emission cathode device.

Description of Related Art

Figure 1:
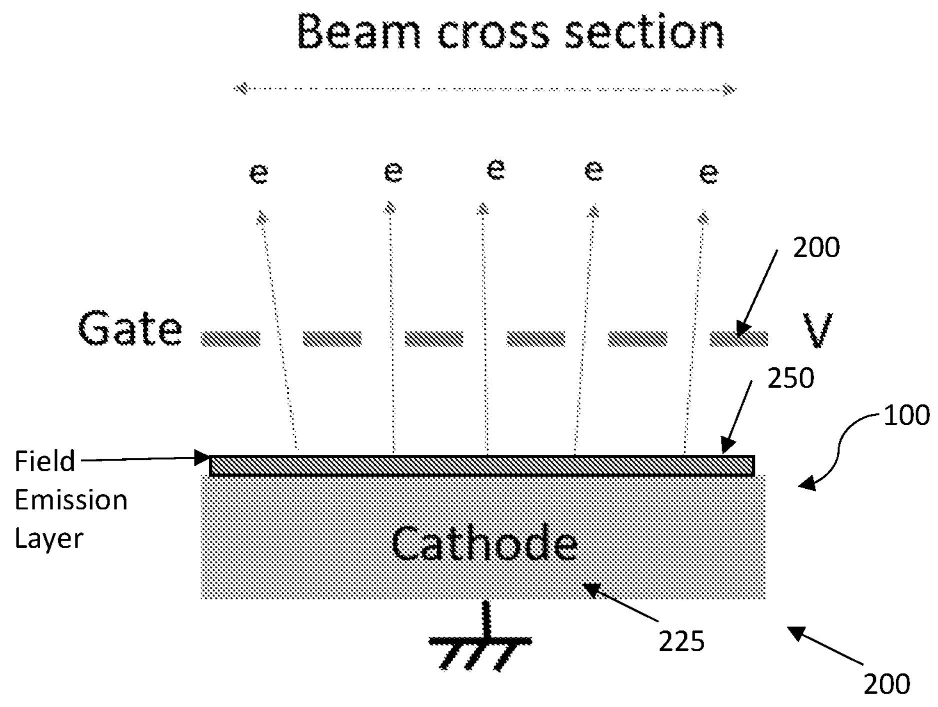
FIG. 1 Prior Art

A typical field emission cathode assembly includes a field emission cathode and an extraction gate structure with certain gap distance in between, an example of which is shown in FIG. 1. In such prior art examples, an external voltage ($V_G$) is applied to the gate electrode, while the cathode is electrically grounded, in order to extract field emission electrons out of the cathode surface.

A field emission cathode, in a typical scenario, only operates stably under a certain maximum current density. As such, in order to achieve a stable high current, a cathode with a large area is generally required. The electron emission area (e.g., corresponding to the electron beam cross-section) is defined by the corresponding cathode area, as illustrated in FIG. 1. A large cathode generally generates an electron beam with a large beam cross section. For many applications, however, the wide electron beam (large beam cross-section) must be further focused/condensed in order to achieve a smaller and more focused beam cross-section size. However, it is often difficult to achieve the required focusing of the electron beam for cathodes with large emission areas.

Thus, there exists a need for a device and formation method for a field emission cathode assembly having a large-area cathode for achieving stable high current that is also capable of forming a small and focused electron beam cross-section from the field emission electrons. That is, it would be desirable to achieve a field emission cathode assembly capable of increasing the total amount of field emission electrons (e.g., current) emitted from a given area (e.g., gate size), without significantly increasing the electron beam cross section, and while protecting the cathode from ion bombardment.

SUMMARY OF THE DISCLOSURE

The above and other needs are met by aspects of the present disclosure which includes, without limitation, the following example embodiments and, in one particular aspect, provides a field emission cathode device, comprising a field emission cathode including a cylindrical substrate having a field emission material deposited on a cylindrical surface thereof, the field emission cathode defining a longitudinal axis: a solenoid extending concentrically about the cylindrical surface of the field emission cathode, and defining a gap therebetween, the solenoid defining opposed first and second open ends extending perpendicularly to the longitudinal axis: a current source ($V_1$) electrically connected to the solenoid and arranged to direct a constant polarity (DC) current (I) thereto, the DC current (I) in the solenoid forming a magnetic field (B) along the solenoid; and a gate voltage source ($V_G$) electrically connected to the solenoid or the field emission cathode and arranged to interact therewith to generate an electric field (E) inducing the field emission cathode to emit electrons (e) from the field emission material into the gap, the emitted electrons being responsive to the magnetic field to spiral within the gap and about the longitudinal axis, in correspondence with the current flow in the solenoid, through the first open end of the solenoid.

Another example aspect provides a method of forming a field emission cathode device, comprising inserting a cylindrical substrate of a field emission cathode into a solenoid such that the solenoid extends concentrically about a cylindrical surface of the substrate and defines a gap therebetween, the field emission cathode defining a longitudinal axis and the solenoid defining opposed first and second open ends extending perpendicularly to the longitudinal axis: directing a constant polarity (DC) current (I) to the solenoid from a current source ($V_I$) electrically connected thereto, the DC current (I) in the solenoid forming a magnetic field (B) along the solenoid; and generating an electric field (E) with a gate voltage source ($V_G$) electrically connected to the solenoid or the field emission cathode, the electric field (E) inducing the field emission cathode to emit electrons (e) from the field emission material into the gap, the emitted electrons being responsive to the magnetic field to spiral within the gap and about the longitudinal axis, in correspondence with the current flow in the solenoid, through the first open end of the solenoid.

The present disclosure thus includes, without limitation, the following example embodiments:

Example Embodiment 1: A field emission cathode device, comprising a field emission cathode including a cylindrical substrate having a field emission material deposited on a cylindrical surface thereof, the field emission cathode defining a longitudinal axis: a solenoid extending concentrically about the cylindrical surface of the field emission cathode, and defining a gap therebetween, the solenoid defining opposed first and second open ends extending perpendicularly to the longitudinal axis: a current source electrically connected to the solenoid and arranged to direct a constant polarity (DC) current thereto, the DC current in the solenoid forming a magnetic field along the solenoid; and a gate voltage source electrically connected to the solenoid or the field emission cathode and arranged to interact therewith to generate an electric field inducing the field emission cathode to emit electrons from the field emission material into the gap, the emitted electrons being responsive to the magnetic field to spiral within the gap and about the longitudinal axis, in correspondence with the current flow in the solenoid, through the first open end of the solenoid.

Example Embodiment 2: The device of any preceding example embodiment, or combinations thereof, comprising an anode disposed in spaced-apart relation to the first open end of the solenoid; and a high voltage source electrically connected to the anode and arranged to apply a voltage of at least about 10 kV to the anode, the anode being responsive to the application of the voltage thereto to attract the electrons emitted from the first open end of the solenoid.

Example Embodiment 3: The device of any preceding example embodiment, or combinations thereof, wherein a velocity of the electrons attracted to the anode is proportional to the voltage applied to the anode.

Example Embodiment 4: The device of any preceding example embodiment, or combinations thereof, wherein an amount of the electrons emitted through the first open end of the solenoid is proportional to a voltage applied by the gate voltage source to generate the electric field.

Example Embodiment 5: The device of any preceding example embodiment, or combinations thereof, wherein a focus of the electrons emitted from the first open end of the solenoid is proportional to a diameter of the first open end.

Example Embodiment 6: The device of any preceding example embodiment, or combinations thereof, wherein a focus of the electrons emitted from the first open end of the solenoid is proportional to a dimension of the gap between the solenoid and the cylindrical surface of the field emission cathode at the first open end.

Example Embodiment 7: The device of any preceding example embodiment, or combinations thereof, wherein the cylindrical substrate is comprised of an electrically conductive material or a metallic material.

Example Embodiment 8: The device of any preceding example embodiment, or combinations thereof, wherein the field emission material deposited on the cylindrical surface comprises nanotubes, nanowires, graphene, amorphous carbon, or combination thereof.

Example Embodiment 9: The device of any preceding example embodiment, or combinations thereof, wherein the cylindrical substrate has a diameter of between about 1 mm and about 5 cm, and the gap is between about 100 μm and about 1 mm.

Example Embodiment 10: The device of any preceding example embodiment, or combinations thereof, wherein the first and second open ends of the solenoid have a diameter of between about 1 mm and about 5 cm.

Example Embodiment 11: A method of forming a field emission cathode device, comprising inserting a cylindrical substrate of a field emission cathode into a solenoid such that the solenoid extends concentrically about a cylindrical surface of the substrate and defines a gap therebetween, the field emission cathode defining a longitudinal axis and the solenoid defining opposed first and second open ends extending perpendicularly to the longitudinal axis: directing a constant polarity (DC) current to the solenoid from a current source electrically connected thereto, the DC current in the solenoid forming a magnetic field along the solenoid; and generating an electric field with a gate voltage source electrically connected to the solenoid or the field emission cathode, the electric field inducing the field emission cathode to emit electrons from the field emission material into the gap, the emitted electrons being responsive to the magnetic field to spiral within the gap and about the longitudinal axis, in correspondence with the current flow in the solenoid, through the first open end of the solenoid.

Example Embodiment 12: The method of any preceding example embodiment, or combinations thereof, comprising depositing a field emission material on the cylindrical surface of the substrate.

Example Embodiment 13: The method of any preceding example embodiment, or combinations thereof, comprising applying a voltage of at least about 10 kV from a high voltage source to an anode disposed in spaced-apart relation to the first open end of the solenoid, the anode being responsive to the application of the voltage thereto to attract the electrons emitted from the first open end of the solenoid.

Example Embodiment 14: The method of any preceding example embodiment, or combinations thereof, comprising varying a diameter of the first open end of the solenoid to proportionally vary a focus of the electrons emitted from the first open end.

Example Embodiment 15: The method of any preceding example embodiment, or combinations thereof, comprising varying a dimension of the gap between the solenoid and the cylindrical surface of the field emission cathode at the first open end of the solenoid to proportionally vary a focus of the electrons emitted from the first open end.

Example Embodiment 16: The method of any preceding example embodiment, or combinations thereof, comprising forming the cylindrical substrate of an electrically conductive material or a metallic material, and depositing the field emission material comprised of nanotubes, nanowires, graphene, amorphous carbon, or combinations thereof on the cylindrical surface of the cylindrical substrate.

Example Embodiment 17: The method of any preceding example embodiment, or combinations thereof, wherein inserting the cylindrical substrate into the solenoid comprises inserting the cylindrical substrate having a diameter of between about 1 mm and about 5 cm into the solenoid, such that the gap is between about 100 μm and about 1 mm.

Example Embodiment 18: The method of any preceding example embodiment, or combinations thereof, comprising forming the solenoid such that the first and second open ends of the solenoid have a diameter of between about 1 mm and about 5 cm.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2A:
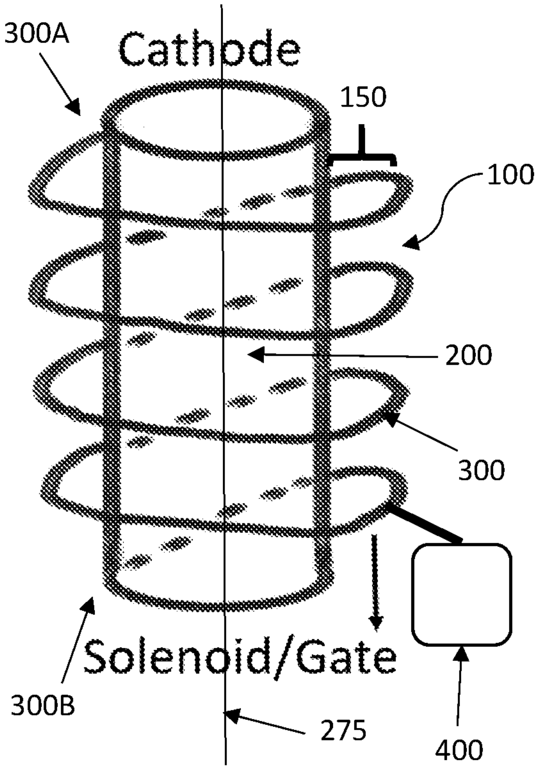
Figure 2B:
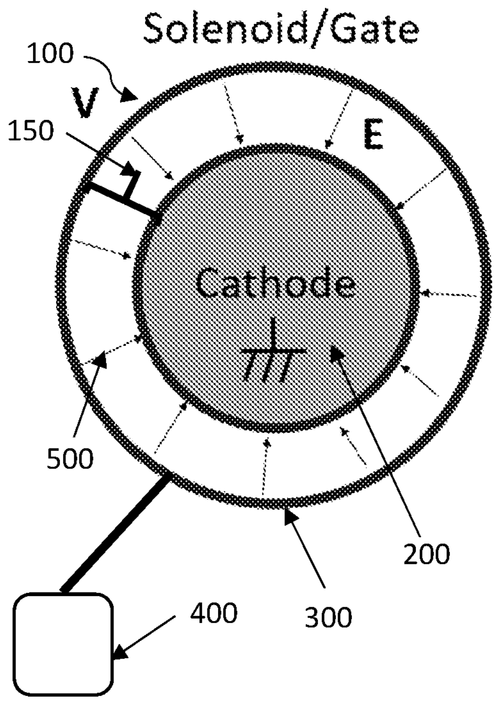
Figure 3A:
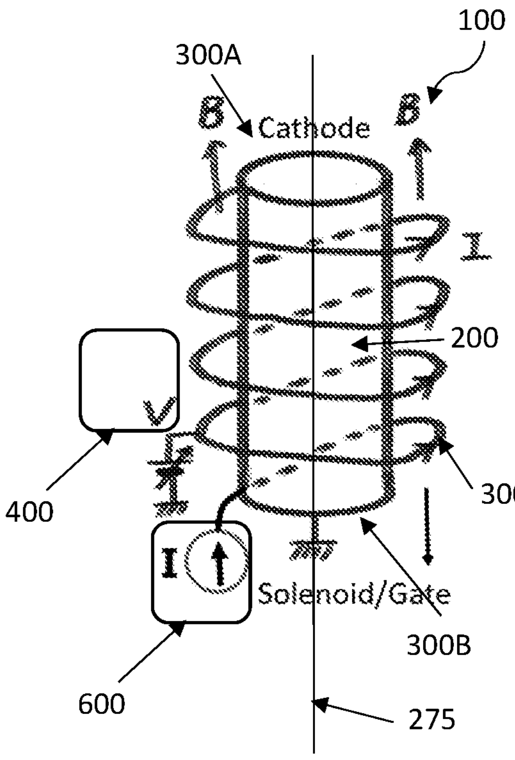
Figure 3B:
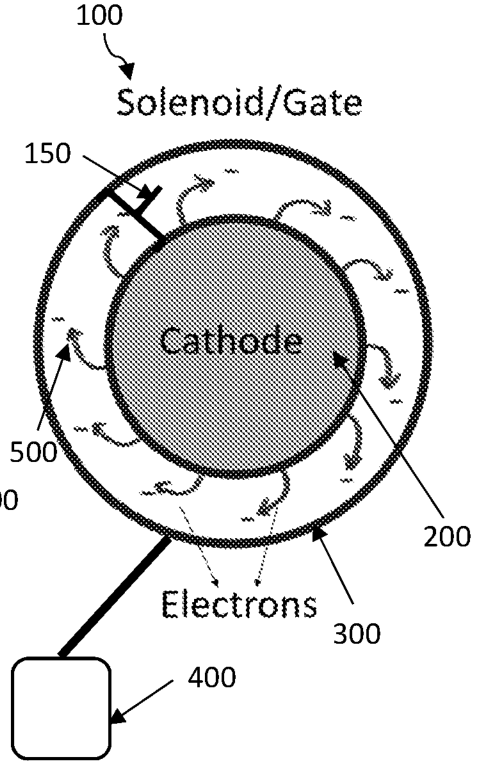
Figure 4A:
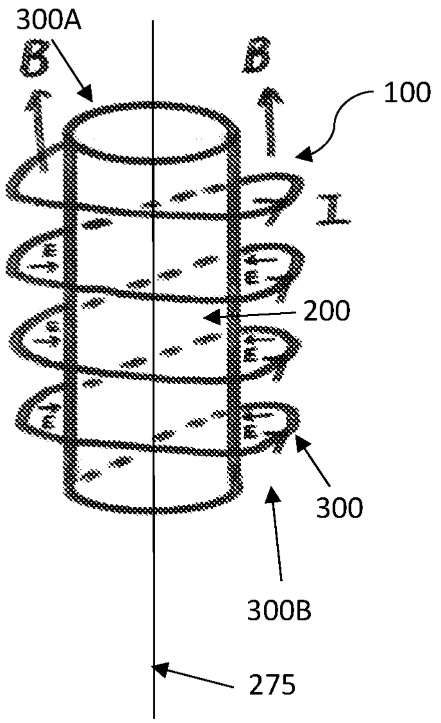
Figure 4B:
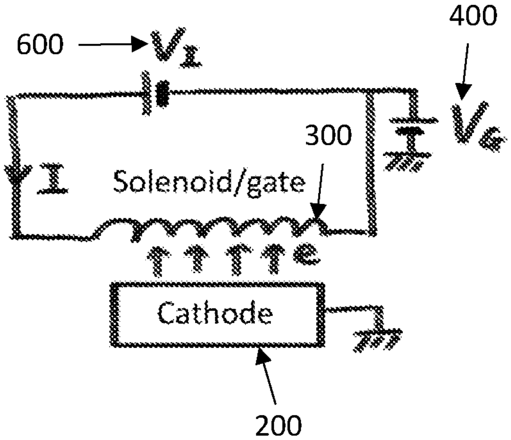
Figure 4C:
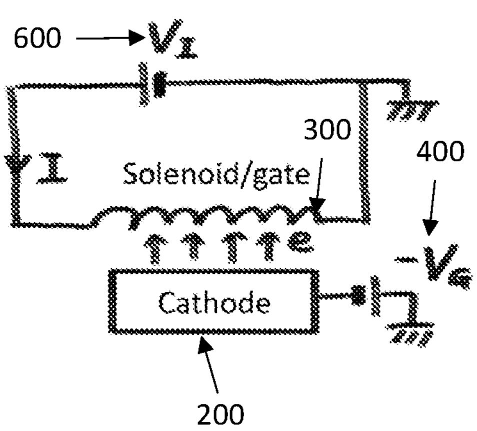
Figure 5:
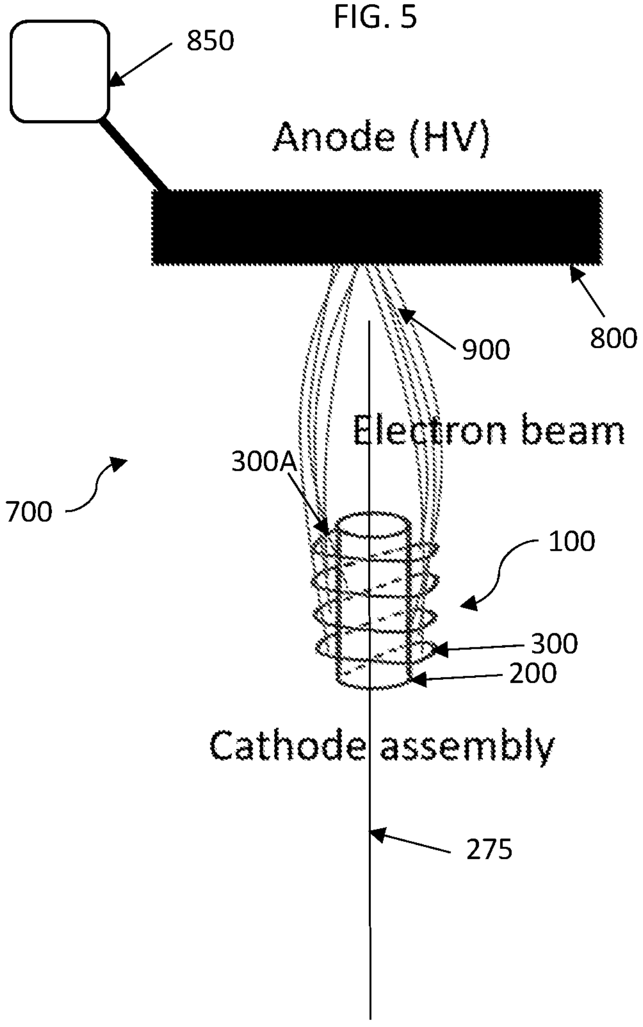

Having thus described the disclosure in general terms, reference will now be made to the accompanying drawings, which are not necessarily drawn to scale, and wherein:

FIG. 1 schematically illustrates a prior art example of a field emission cathode device:

FIG. 2A schematically illustrates a perspective view of a field emission cathode device, according to one aspect of the present disclosure:

FIG. 2B schematically illustrates a cross-sectional view of a field emission cathode device, according to the aspect of the present disclosure shown in FIG. 2A:

FIG. 3A schematically illustrates a perspective view of a field emission cathode device, according to the aspect of the present disclosure shown in FIG. 2A, having electrical connections to the cathode and the solenoid:

FIG. 3B schematically illustrates a cross-sectional view of a field emission cathode device, according to the aspect of the present disclosure shown in FIG. 2B, having the electrical connections to the cathode and the solenoid:

FIG. 4A schematically illustrates a perspective view of a field emission cathode device, according to one aspect of the present disclosure, showing the electric field and the magnetic field associated therewith:

FIG. 4B schematically illustrates an electrical diagram of the field emission cathode device, according to the aspect of the disclosure shown in FIG. 4A, with the solenoid/gate electrode floated at a positive gate voltage ($V_G$):

FIG. 4C schematically illustrates an electrical diagram of the field emission cathode device, according to the aspect of the disclosure shown in FIG. 4A, with the cathode biased at a negative gate voltage ($-V_G$); and FIG. 5 schematically illustrates a field emission cathode device, according to one aspect of the present disclosure, with the cathode and solenoid having a high voltage anode interacting therewith.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein: rather, these aspects are provided so that this disclosure will satisfy applicable legal requirements. Like numbers refer to like elements throughout.

FIGS. 2A, 2B, 3A, 3B, 4A-4C, and 5 illustrate various aspects of a field emission cathode device 100, and method of forming a field emission cathode device 100. In one example aspect, as shown in FIGS. 2A and 2B, the field emission cathode device 100 comprises a field emission cathode 200 including a cylindrical substrate 225 having a field emission material 250 deposited on a cylindrical surface of the cylindrical substrate 225 (see, e.g., FIG. 1). The field emission cathode 200 defines a longitudinal axis 275 and, in one aspect, is electrically connected to ground (see, e.g., FIGS. 3A and 4B). A solenoid 300 extends concentrically about the cylindrical surface (e.g., the layer of the field emission material 250) of the field emission cathode 200, and defines a gap 150 between the cylindrical surface and the solenoid 300. The solenoid 300 further defines opposed first and second open ends 300A. 300B extending perpendicularly to the longitudinal axis 275. In one aspect, a gate voltage source 400 ($V_G$) is electrically connected (floated) to the solenoid 300 (sec. e.g. FIGS. 3A and 4B) and is arranged to generate an electric field 500 (E) between the solenoid 300 (e.g., gate electrode) and the field emission cathode 200. The field emission cathode 200 is responsive to the electric field 500 (E) to emit electrons (e) from the field emission material 250 into the gap 150 (see. e.g., FIG. 3B). A current source 600 ($V_I$) is electrically connected to the solenoid 300 (see. e.g. FIGS. 3A and 4B) and is arranged to direct a constant polarity (DC) current (I) thereto, wherein the DC current (I) in the solenoid 300 induces a magnetic field (B) along the solenoid 300, which constrains electrons from passing radially through the solenoid 300. The electrons emitted from the cathode 200 in response to the electric field (E) are further responsive to (constrained by) the magnetic field (B) to spiral within the gap 150 and about the longitudinal axis 275, in correspondence with the current flow (I) in the solenoid 300, through the first open end 300A of the solenoid 300 (see, e.g., FIG. 4A). The spiral flow of electrons through the first open end 300A thus forms an electron beam 700 (see. e.g., FIG. 5). Instead of the cathode 200 electrically connected to ground and the solenoid 300/gate electrode floated at a positive gate voltage ($V_G$), as shown in FIG. 4B, the cathode 200 can be biased at a negative gate voltage ($-V_G$), while the solenoid 300 is electrically connected to ground (see. e.g., FIG. 4C).

In particular aspects, the cylindrical substrate 225 defining the cathode 200 is comprised of an electrically conductive material or a metallic material. In such aspects, the field emission material 250 deposited on the cylindrical surface of the substrate 225 comprises a layer of nanotubes, nanowires, graphene, amorphous carbon, or combinations thereof. The solenoid 300 is comprised, for example, of a coil of a suitable dimension of wire. Further, in some aspects, the first and second open ends 300A. 300B of the solenoid 300 have a diameter (e.g., the inner dimension of the coil) of between about a few millimeters (e.g., 1 mm) and about a few centimeters (e.g., 5 cm). In some aspects, the cylindrical substrate 225 has a diameter of between about a few millimeters (e.g., 1 mm) and about a few centimeters (e.g., 5 cm), and the gap 150 defined between the solenoid 300 and the cylindrical surface of the substrate 225 is between about 100 μm and about 1 mm.

As shown, for example, in FIGS. 2A and 2B, the cathode 200 is inserted into the solenoid 300, such that the solenoid 300 extends concentrically about the cylindrical surface (e.g., the layer of the field emission material 250) of the substrate 225. In the context of a field emission cathode device 100, the solenoid 300 is arranged as a field emission gate electrode with respect to the cathode 200. The dimension of the gap 150 is determined by the chosen dimension (e.g., outer diameter) of cathode 200 in relation to the dimension (e.g., inner diameter) of the solenoid 300 (corresponding to the dimension of the first and second open ends 300A. 300B).

As shown in FIGS. 3A. 3B, and 4B, in order to generate the field emission (electrons), the solenoid 300 (gate electrode) is electrically connected to a power supply 400 (gate voltage source. $V_G$) while the cathode 200 is electrically connected to ground. Application of a voltage by the gate voltage source 400 ($V_G$), whether as a constant polarity (DC) continuous voltage or as a pulsed DC voltage, to the solenoid 300 by the power supply ($V_G$) causes an electric field 500 to be established between the cathode 200 and the solenoid 300. The electron emission current is generated by the voltage applied by the power supply 400 ($V_G$) to the solenoid 300. In an alternative, the cathode 200 can be biased at a negative gate voltage ($-V_G$), while the solenoid 300 is electrically connected to ground (sec. e.g., FIG. 4C), to generate the electric field (E). In either instance, in some aspects, the amount of electrons generated and emitted from the cylindrical surface (e.g., the layer of the field emission material 250) of the cathode 200 is proportional to the magnitude of the voltage applied by the power supply 400 ($V_G$ or $-V_G$) to the solenoid 300 or the cathode 200. In addition, a DC current (I) directed from a current source 600 ($V_I$) to the solenoid 300 causes the DC current (I) to flow along the coil of the solenoid 300, and establishes a magnetic field (B) along the solenoid 300 as shown, for example, in FIGS. 3A. 3B, and 4A. By controlling the DC current (I) along the coil of the solenoid 300, and thus controlling the magnitude of the magnetic field (B), the electrons emitted from the cathode 200 are induced to travel in a spiral motion in the gap 150, as influenced by the magnetic field which otherwise restricts the electrons from being directed radially outward through the coil of the solenoid 300.

In such an arrangement, the amount of the electrons emitted through the first open end 300A of the solenoid 300 are the electrons emitted from the cylindrical surface (e.g., the layer of the field emission material 250) of the cathode 200, and the amount of electrons is thus proportional to the DC voltage (continuous or pulsed) applied to the solenoid 300. Further, the induced spiral motion of the emitted electrons within the gap 150 continues upon the electrons exiting through the first open end 300A of the solenoid 300. The cross-section of the resulting electron beam (the spiral projection of the emitted electrodes-sec. e.g., element 900 in FIG. 5) is thus determined by the dimension of the first open end 300A of the solenoid 300, instead of the overall emitting area (the cylindrical surface) of the cathode 200. Upon exiting the first open end 300A, the emitted electrons are not further constrained by the arrangement of the gap 150 or the cylindrical substrate/cathode 200. As such, the spiral beam will constrict (reduce in cross-sectional area) and focus the electron beam. Accordingly, in some aspects, the focus of the electrons emitted from the first open end 300A of the solenoid 300 (e.g., the electron beam 900) is proportional to a diameter of the first open end 300A and/or to the dimension of the gap 150 between the solenoid 300 and the cylindrical surface of the field emission cathode 300 at the first open end 300A. In other aspects, the characteristics of the electron beam 900 may also be influenced by the configuration/shape of the cathode 200 about the first open end 300A of the solenoid 300.

One application of the aspects of the field emission cathode device disclosed herein include, for example, an X-ray tube 700. In such an application, as shown, for example, in FIG. 5, an anode 800 is disposed in spaced-apart relation to the first open end 300A of the solenoid 300. In addition, a high voltage source 850 is electrically connected to the anode 800 and arranged to apply a voltage of at least about 10 kV to the anode 800. The anode 800 is responsive to the application of the voltage thereto to attract the electrons emitted from the first open end 300A of the solenoid 300 (i.e., attracts the electron beam 900). In some aspects, the velocity of the electrons (e.g., electron beam 900) attracted to the anode 800 is proportional to the voltage applied to the anode 800.

That is, the anode 800 having the high voltage (HV) applied thereto is disposed in spaced apart relation with respect to the field emission cathode device 100. Under the influence of the anode 800 having the high voltage applied thereto, the electrons going through spiral motion within the gap 150 are attracted by and toward the anode 800. Since the electrons are confined within the gap 150 by the magnetic field generated by the solenoid 300, the cross-section of the electron beam 900 exiting the first open end 300A of the solenoid 300 is proportional to and at least partially determined by the dimension of the first open end 300A of the solenoid 300. However, since the electrons forming the electron beam 900 are emitted from the side of the cathode 200 (e.g., the cylindrical surface of the substrate), the overall emitting area of the field emission cathode device 100 is larger than the dimension of the first open end 300A of the solenoid 300, and is not limited by the cross-section (dimensions) of the emitting area of the cathode itself. Such aspects of the present disclosure thus provide a field emission cathode device 100 capable of achieving stable high current, while also forming a small and focused electron beam cross-section from the field emission electrons, with the field emission current directed through the first open end of the solenoid providing additional protection of the cathode from ion bombardment.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a". "an" and "the" are intended to include the plural forms as well, unless the context clearly indicates otherwise. It will be further understood that the terms "comprises". "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A field emission cathode device, comprising:

a field emission cathode including a cylindrical substrate having a field emission material deposited on a cylindrical surface thereof, the field emission cathode defining a longitudinal axis;

a solenoid extending concentrically about the cylindrical surface of the field emission cathode, and defining a gap therebetween, the solenoid defining opposed first and second open ends extending perpendicularly to the longitudinal axis;

a current source electrically connected to the solenoid and arranged to direct a constant polarity (DC) current thereto, the DC current in the solenoid forming a magnetic field along the solenoid; and a gate voltage source electrically connected to the solenoid or the field emission cathode and arranged to interact therewith to generate an electric field inducing the field emission cathode to emit electrons from the field emission material into the gap, the emitted electrons being responsive to the magnetic field to spiral within the gap and about the longitudinal axis, in correspondence with the current flow in the solenoid, through the first open end of the solenoid.

2. The device of claim 1, comprising:

an anode disposed in spaced-apart relation to the first open end of the solenoid; and a high voltage source electrically connected to the anode and arranged to apply a voltage of at least about 10 kV to the anode, the anode being responsive to the application of the voltage thereto to attract the electrons emitted from the first open end of the solenoid.

3. The device of claim 2, wherein a velocity of the electrons attracted to the anode is proportional to the voltage applied to the anode.

4. The device of claim 1, wherein an amount of the electrons emitted through the first open end of the solenoid is proportional to a voltage applied by the gate voltage source to generate the electric field.

5. The device of claim 1, wherein a focus of the electrons emitted from the first open end of the solenoid is proportional to a diameter of the first open end.

6. The device of claim 1, wherein a focus of the electrons emitted from the first open end of the solenoid is proportional to a dimension of the gap between the solenoid and the cylindrical surface of the field emission cathode at the first open end.

7. The device of claim 1, wherein the cylindrical substrate is comprised of an electrically conductive material or a metallic material.

8. The device of claim 1, wherein the field emission material deposited on the cylindrical surface comprises nanotubes, nanowires, graphene, amorphous carbon, or combination thereof.

9. The device of claim 1, wherein the cylindrical substrate has a diameter of between about 1 mm and about 5 cm, and the gap is between about 100 μm and about 1 mm.

10. The device of claim 1, wherein the first and second open ends of the solenoid have a diameter of between about 1 mm and about 5 cm.

11. A method of forming a field emission cathode device, comprising:

inserting a cylindrical substrate of a field emission cathode into a solenoid such that the solenoid extends concentrically about a cylindrical surface of the substrate and defines a gap therebetween, the field emission cathode defining a longitudinal axis and the solenoid defining opposed first and second open ends extending perpendicularly to the longitudinal axis;

directing a constant polarity (DC) current to the solenoid from a current source electrically connected thereto, the DC current in the solenoid forming a magnetic field along the solenoid; and generating an electric field with a gate voltage source electrically connected to the solenoid or the field emission cathode, the electric field inducing the field emission cathode to emit electrons from the field emission material into the gap, the emitted electrons being responsive to the magnetic field to spiral within the gap and about the longitudinal axis, in correspondence with the current flow in the solenoid, through the first open end of the solenoid.

12. The method of claim 11, comprising depositing a field emission material on the cylindrical surface of the substrate.

13. The method of claim 11, comprising applying a voltage of at least about 10 kV from a high voltage source to an anode disposed in spaced-apart relation to the first open end of the solenoid, the anode being responsive to the application of the voltage thereto to attract the electrons emitted from the first open end of the solenoid.

14. The method of claim 11, comprising varying a diameter of the first open end of the solenoid to proportionally vary a focus of the electrons emitted from the first open end.

15. The method of claim 11, comprising varying a dimension of the gap between the solenoid and the cylindrical surface of the field emission cathode at the first open end of the solenoid to proportionally vary a focus of the electrons emitted from the first open end.

16. The method of claim 11, comprising forming the cylindrical substrate of an electrically conductive material or a metallic material, and depositing the field emission material comprised of nanotubes, nanowires, graphene, amorphous carbon, or combinations thereof on the cylindrical surface of the cylindrical substrate.

17. The method of claim 11, wherein inserting the cylindrical substrate into the solenoid comprises inserting the cylindrical substrate having a diameter of between about 1 mm and about 5 cm into the solenoid, such that the gap is between about 100 μm and about 1 mm.

18. The method of claim 11, comprising forming the solenoid such that the first and second open ends of the solenoid have a diameter of between about 1 mm and about 5 cm.

* * * * *